March 23, 1971     J. R. McCONNELL     3,572,204
HOLE PIERCING APPARATUS

Filed Sept. 11, 1967     3 Sheets-Sheet 1

INVENTOR
BY

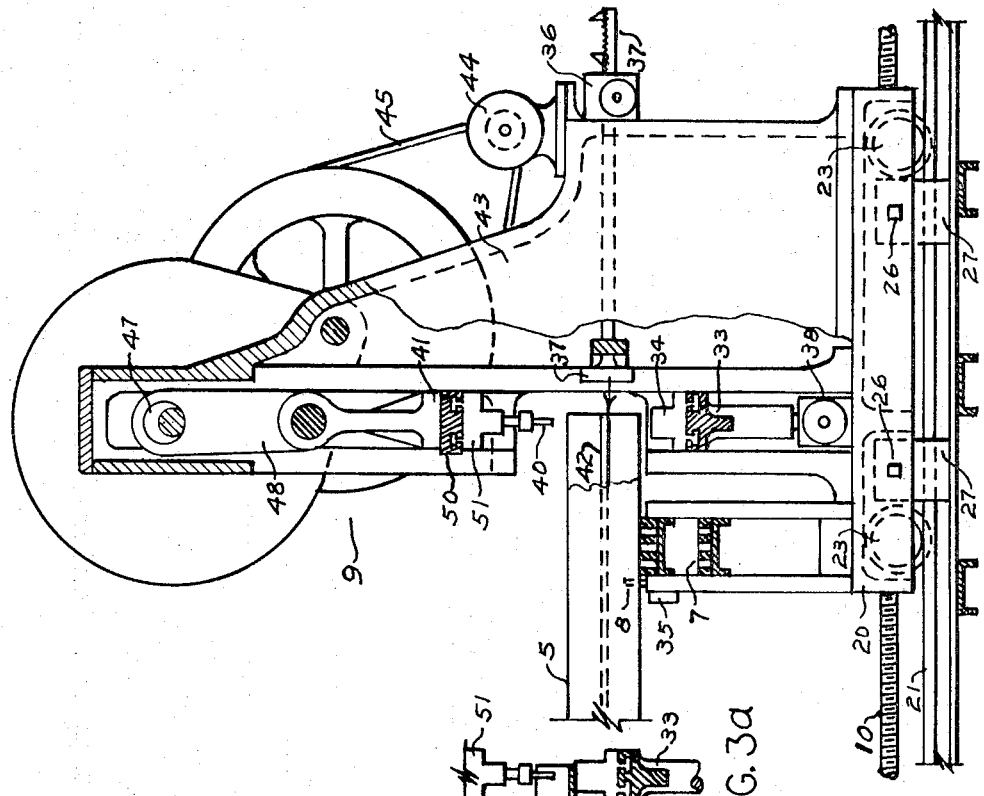

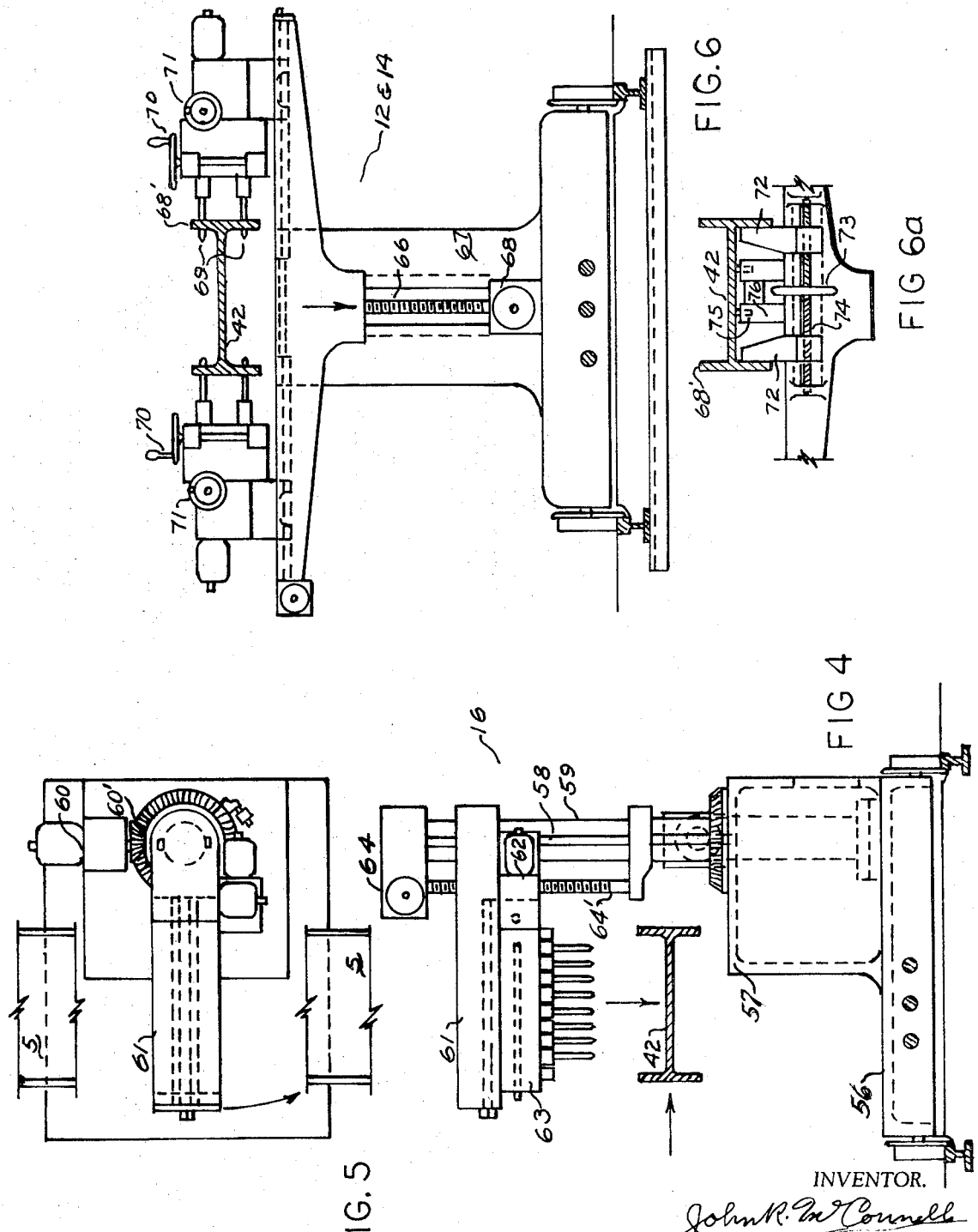

United States Patent Office 3,572,204
Patented Mar. 23, 1971

3,572,204
HOLE PIERCING APPARATUS
John R. McConnell, 148 Woodside Ave.,
Ridgewood, N.J. 07450
Filed Sept. 11, 1967, Ser. No. 666,829
Int. Cl. B26d 7/06
U.S. Cl. 83—421                                       3 Claims

ABSTRACT OF THE DISCLOSURE

A punching apparatus is set forth herein for the simultaneous piercing of holes through the webs of structural beam shapes near each end comprising a fixed and a mobile end located dual punching unit. The mobile unit is wheel mounted on a track on a common longitudinal fabricating line for variable centre to centre spacing of the operating centres of the punching units for the punching-fabrication of beam members of variable effective lengths. The said mobile unit is pre-located by a powered threaded relocating shaft to produce in co-operation with the fixed unit groups of holes as required and indicated by length measuring dials at each end of the beam member. Dual transverse conveyor belts move the shape transversely under the operating heads of the punches, dual length-centering rams longitudinally locate the shape under the punching heads, dies on an elevating anvil raise the shape off the conveyors and selected upper located punches pierce the required holes. On retraction of the punches and dies the member is returned to the conveyors for forward progression to discharge as a completed member.

---

This invention relates to machines and apparatus for the piercing of holes through structural steel shapes.

It is an object of the present invention to combine punching and drilling in the most facile manner for economy, speed and adjustability, with a completely mechanized transverse handling of the material for complete fabrication of beams and girders in a single pass.

It is another objective to provide an apparatus that will automatically length-centre, measure, layout and fabricate structural members of any length, depth or weight, without any change of or alterations to the apparatus.

Another objective is to provide co-ordinated hoisting-transfer apparatus that will continuously feed raw shapes from the adjacent in-bound car onto the transverse conveyor belt and transfer the completely fabricated members from the opposite end of the belt to another adjacent car for outbound shipping to the erection site.

It is also an objective to eliminate temporary storage in the outside storage yard, plural transfers, tucking and in-between storage operations between various manual and machine operating areas, eliminating heavy manual labor and delays.

For other objects and a better understanding of the invention, reference may be had to the following detailed description, taken in conjunction with the accompanying drawing in which:

FIG. 2 is an end elevation of the mobile power punch.

FIG. 3 is a side view of the mobile power punch.

FIG. 3A is a fragmentary view of the elevating action of the multiple dies of the power punch.

FIG. 4 is a side view of the rotatable-head, multiple, web drill.

FIG. 5 is a plan view of the rotatable-head, multiple, web drill.

FIG. 6 is an end view of the underslung-elevatable multiple flange drill.

FIG. 6A is an end view of shape locating vise on the front of FIG. 6.

Figure 1:
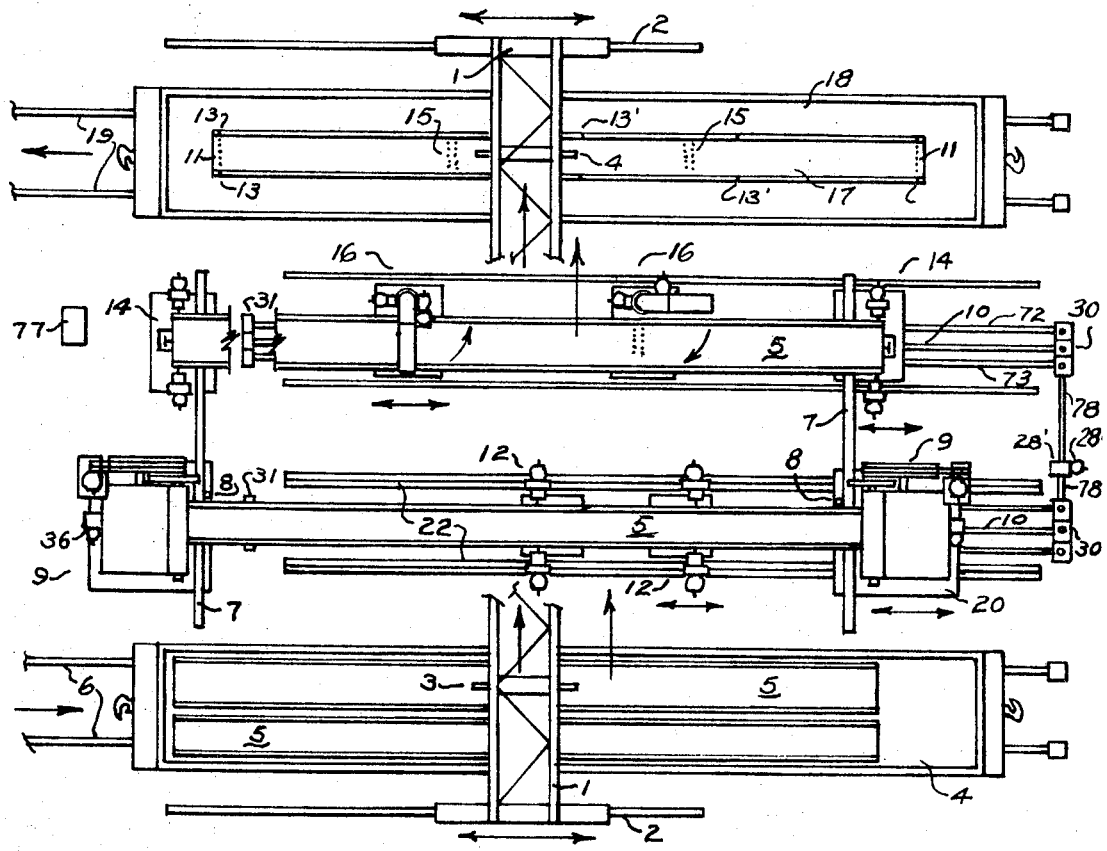
FIG. 1 is a plan layout of the shape-fabricating apparatus.

This application is filed to constitute a co-pending application with Ser. No. 357,207, filed Apr. 3, 1964, now Pat. No. 3,341,683 to be. The present application includes Pat. No. 3,341,683. The present application includes the integrated overhead feeding of material into and out of the apparatus and combines the underslung flange drill of the preceding application into the apparatus. This application is claimed to be a divisional application, possibly classed as a continuation-in-part. It is requested that the former apparatus should not be cited against it.

Reference is made below to a number of other patents held by the applicant. They are all on the same general subject; the Automation Fabrication of Structural Members, and many general principles and mechanism details set forth in them are common to many of them and to this application.

Pat. Nos. 3,085,148, filed Feb. 6, 1956; 3,128,366, filed Aug. 28, 1959; 3,127,661, filed Apr. 7, 1964; 3,257,540, filed Jan. 3, 1963; and 3,331,939, filed Mar. 15, 1963.

In brief, the operation would be; a car comes in from the rolling mill onto the shop siding and is routed directly to a point alongside the fabricating apparatus under a mobile gantry crane. An overhead powered mobile hoist, with internal (trough) grips, picks up a raw girder shape and lowers it onto the dual conveyor belts, approximately centered between the pre-located end power punches. The control console actuates the belts to forward said shape into the jaws of the end punches, where it is stopped by an adjustable stop pin under the centres of the punches, and is length centred there-between. The (lower) anvil, holding the punch dies, elevates to lift the shape off the belt and the required punches are progressively gagged to punch the required number of holes. As the ends of the web are punched, the intermediate mobile flange drill units, pre-located to required dimensions, drill required holes in the flanges. On completion of the work at this station, the shape is lowered to the belts and is forwarded by the said belts to the drilling station, where pre-located intermediate web drilling units drill holes for connections for intermediate floor beams. Simultaneously with this operation, the end located flange drilling units drill holes for lateral wind bracing of the said girder shape to the column on which the girder shape will be connected. After the rotatable heads of the intermediate drills are rotated ninety degrees, a second power hoist and grips lifts the shape off the conveyor belts and nests it in the adjacent shipping car or trailer. The feeding, punching, and drilling of the shapes is continuous and simultaneous.

FIG. 1, showing a plan view of the entire co-ordinated apparatus, sets forth a longitudinally mobile powered gantry crane 1 on guiding-supporting tracks 2, with transversely movable shape-trolleys and powered hoists 3 and 4. The said crane spans all tracks. A railroad gondola 4 (or similar vehicle) delivering raw shapes 5 directly from the rolling mills comes in off the main line tracks, through the siding onto a spur 6 adjacent to the fabricating apparatus. The hoist moves shapes 5 onto dual endless multiple-strand link conveyor belts 7, which forward individual said shapes to adjustable stop pins 8 under the centres of the dual end power punches 9, pre-located longitudinally to precise required dimensions. The left hand fabricating units, with their common operating centres, are longitudinally immovable. The common operating centres of right hand units are longitudinally adjusted in common by threaded shafts 10 to suit the longitudinal dimension of the end holes 11 and 13 in the shape 5. As explained under FIG. 2, the power punches 9 punch the required number of holes in the ends of the web. Simultaneously, the intermediate flange drilling units 12, pre-located to required dimensions, drill holes 13', as under description of FIGS. 6 and 6A, in the flanges at any points required. On completion of the work at this station, actuation of the belts 7 carries the shape forward to the successive drilling station, where end flange holes 13 are drilled by units 14 similar to units 12. Intermediate holes 15 in the web of the shape are drilled by pre-located overhead drill units 16, described under FIGS. 4–5. On completion of work at this station, the hoist 4 lifts the completed member 17 and nests it in the shipping railroad car 18 on spur track 19 for direct delivery to the erection site.

The floor based apparatus will be controlled and directed overall by the console 77. Individual fabricating units will be operated by individual attendants. The power drive 28 and 28' will move and pre-locate the units through shaft 78 and typical individual gear boxes such as 30 and the units individual threaded shafts such as 10, 72 and 73. Final inspection of the member will be at the drilling station.

There is an inherent procedure and method in the said apparatus, which sets forth an integrated combined system in the rapid and economical mechanized handling, measuring, layout and complete fabrication of a certain class of beam and girder members, in a single continuing operation, without heavy manual labor. Its greatest advantage is in the production of identical or nearly identical members, as in high buildings, where in many structures hundreds of identical members are required.

FIGS. 2 and 3 show the right hand mobile power punch base 20 wheel mounted on a doubled rail 21, track 22. The said wheels 23 are double rimmed 24 with a centre flange 25. Screw 26 operated retractable clamps 27 lock the power punch 9 to the double rails, wedging on the slopes of the rails against the reciprocating action of the unit. Powered 28 threaded shaft 10 through speed reducer 28' and gear box 30 moves the unclamped power punch 9, pre-locating it to required dimension as indicated by dial 31, direct connected to the shaft 10. A multiple strand endless link roller belt shape conveyor 32, supported over the toe of the base 20 and common to the end fabricators 9 and 14, moves the shape over the elevatable anvil 33 holding the required multiple punch dies 34. The shape is stopped over the centres of said dies by an adjustable solenoid 35, projected stop pin 8.

Matched motor-speed-reducers 36 on the backs of the end located dual power punches 9 simultaneously and equally project rams 37 against the ends of the shape 5, to length-centre the said shape between the power punches 9 and to locate the required holes equi-distant from each end of the said shape.

On the raising of the anvil by motor-speed reducer 38, shaft, gear trains and dual elevating screws 39, the multiple punches 40 are moved down by ram 41 to punch the required holes 11 in the web 42 of the shape. The holes are generally progressively punched in limited sets by a simple compressed air gaging arrangement (not shown for clarity). The power punch frame 43 supports the driving motor 44, belt drive to fly-wheel 45, reduction gearing 46, eccentrics 47 on shaft, cranks 48, ram 41, T-keyed punch bolster 50, and punch carriers 51. Motor-speed-reducer 52 moves the conveyor belt 7. Steel channel ties 53 anchor rails to substantial concrete slab foundation 54.

FIG. 3A shows the shape raised ready for punching.

FIGS. 4 and 5 show a side and plan view of the intermediately located rotatable-head plural-spindle drill press 16, mounted on a wheeled base 56 and table 57. A hollow splined 58 cylindrical column 59, rotatable in the table by a motor-speed-reducer drive 60 and gears 60', carries the supporting arm 61 for the rectangular powered 62 plural drill box 63. Said arm is lowered by a powered 64 threaded shaft 64' to drill the web 42 of shape 5. On completion of the operation, the supporting arm is raised and rotated ninety degrees to enable the completed member 17 to be raised vertically, for loading into the shipping vehicle 18, without damage to the drill press. The units are pre-located by powered threaded shafts 72 and 73.

FIG. 6 shows a wheeled underslung flange drilling unit 12 and 14 elevatable by powered thread shaft 66 on the short back wall 67 by power unit 68 after the shape 5 is in place, to drill the flange 68' of the shape at the ends or at any point of its length. Said unit 12 or 14 is shown in four places on the two stations. The adjustable centre drills 69 are a commercial article adjustable to various centres by wheels 70 and finely adjustable as to length by wheel 71. They are symmetrically convergable against shape flanges 68'. The three mobile units are pre-locatable to dimension by the usual powered threaded shafts, threaded through the bases of the units, while other shafts pass through holes in the said bases.

FIG. 6A, mounted on the front of the table of FIG. 6, is an internal vise, 72 expandable in the lower trough of the shape by wheel 73 and right and left threaded shaft 74, to steady the shape against the drilling of the flanges. Adjustable height threaded set screws 75, in standards 76, can be adjusted to compensate for thin or thick shape webs 42 in relation to the centre line of the drills 69.

What I claim as new and desire to protect by Letters Patent of the United States is:

1. A structural power punch press comprising a frame supporting an integrated powered mechanism for the vertical reciprocative motion of plural punches through work material and into punch aligned mating dies mounted on a powered elevatable anvil, a vertical gap in the vertical front guide-ways of said frame, the said anvil and dies elevatable by attached vertical screw means through a train of gears and shafts connected to the said power means contacting the work material and raising it off a transversely operable shape conveyor integrally mounted on an above the front toe of the power press frame to punching height.

2. A punch press as in claim 1, further comprising, a powered longitudinally projectible ram, whereby the end of the shape can be precisely located longitudinally under the said punches.

3. A punch press apparatus as in claim 2 further comprising a dual opposite hand punch press-conveyor unit mobilely mounted on plural wheels, supported, guided and variably spaceable on a track by a powered shaft threaded through the base of the dual unit's frame whereby the inwardly facing said units located on a common longitudinal centre line are longitudinally spaceable for the simultaneous precise punching of holes near both ends of structural shapes of various lengths.

References Cited

UNITED STATES PATENTS

| | | | |
|---|---|---|---|
| 972,203 | 10/1910 | Malton | 83—623X |
| 1,135,531 | 4/1915 | Koehl | 83—421 |
| 1,175,198 | 3/1916 | Thomas | 83—560X |
| 1,241,254 | 9/1917 | Payne et al. | 83—560X |
| 1,602,421 | 10/1926 | Thomas | 83—623X |
| 2,641,321 | 6/1953 | Cruzan | 83—155X |
| 3,391,593 | 7/1968 | Jordan. | |

FRANK T. YOST, Primary Examiner

U.S. Cl. X.R.

83—517, 560, 563, 566